United States Patent
Yamashina et al.

(10) Patent No.: US 9,657,476 B2
(45) Date of Patent: May 23, 2017

(54) VIBRATION CONTROL DEVICE

(71) Applicants: MITSUBISHI HEAVY INDUSTRIES, LTD., Tokyo (JP); MITSUBISHI HEAVY INDUSTRIES MECHATRONICS SYSTEMS, LTD., Kobe-shi, Hyogo (JP)

(72) Inventors: Yusuke Yamashina, Tokyo (JP); Tadaaki Monzen, Tokyo (JP); Atsushi Kubo, Hiroshima (JP)

(73) Assignees: MITSUBISHI HEAVY INDUSTRIES, LTD., Tokyo (JP); MITSUBISHI HEAVY INDUSTRIES MECHATRONICS SYSTEMS, LTD., Hyogo (JP)

( * ) Notice: Subject to any disclaimer, the term of this patent is extended or adjusted under 35 U.S.C. 154(b) by 91 days.

(21) Appl. No.: 14/762,448

(22) PCT Filed: Aug. 8, 2013

(86) PCT No.: PCT/JP2013/004789
§ 371 (c)(1),
(2) Date: Jul. 21, 2015

(87) PCT Pub. No.: WO2014/128790
PCT Pub. Date: Aug. 28, 2014

(65) Prior Publication Data
US 2015/0361658 A1  Dec. 17, 2015

(30) Foreign Application Priority Data
Feb. 22, 2013  (JP) .................................. 2013-033877

(51) Int. Cl.
*E04B 1/98* (2006.01)
*G05B 19/404* (2006.01)
(Continued)

(52) U.S. Cl.
CPC ............. *E04B 1/985* (2013.01); *E04H 9/027* (2013.01); *F16F 7/1005* (2013.01);
(Continued)

(58) Field of Classification Search
CPC .................. E04B 1/985; G05B 19/404; G05B 2219/39199; E04H 9/027; E04H 2009/026; F16F 7/1005
See application file for complete search history.

(56) References Cited

U.S. PATENT DOCUMENTS 4,504,760 A * 3/1985 Yamamoto ............. H02N 2/163
 310/317
5,291,975 A * 3/1994 Johnson ............... B63H 21/302
 188/378

(Continued)

FOREIGN PATENT DOCUMENTS

| JP | 5-79531 A | 3/1993 |
|---|---|---|
| JP | 6-58014 A | 3/1994 |
| JP | 2007-239942 A | 9/2007 |
| JP | 2010-255791 A | 11/2010 |
| JP | 2011-174509 A | 9/2011 |
| JP | 4857829 B2 | 1/2012 |

OTHER PUBLICATIONS

International Search Report mailed Sep. 24, 2013 in related International Application No. PCT/JP2013/004789.

*Primary Examiner* — Ramesh Patel
(74) *Attorney, Agent, or Firm* — Kanesaka Berner and Partners LLP

(57) ABSTRACT

A vibration control device that can achieve the best vibration control effect within an allowable stroke range of a movable mass includes a controller that calculates at least one of a displacement deviation between a target displacement of a movable mass and a displacement of the movable mass detected by a mass displacement sensor and a velocity deviation between a target velocity of the movable mass and a velocity of the movable mass detected by a mass velocity sensor, and generates a control command for making a motor (Continued)

drive the movable mass on the basis of at least one of the displacement deviation and the velocity deviation. The target displacement and the target velocity are set in a manner that the amplitude of the movable mass becomes constant and that phases thereof are delayed 90 degrees with respect to the vibration of a building.

10 Claims, 6 Drawing Sheets

(51) Int. Cl.
  *E04H 9/02* (2006.01)
  *F16F 7/10* (2006.01)
(52) U.S. Cl.
  CPC ...... *G05B 19/404* (2013.01); *E04H 2009/026* (2013.01); *G05B 2219/39199* (2013.01)

(56) References Cited

U.S. PATENT DOCUMENTS

| | | | | |
|---|---|---|---|---|
| 5,368,425 A * | 11/1994 | Mills | ........................ | B23Q 1/01 |
| | | | | 408/234 |
| 5,500,578 A * | 3/1996 | Kawamura | .............. | H02N 2/14 |
| | | | | 310/316.02 |
| 5,533,597 A * | 7/1996 | Nezu | .................. | B60G 17/0165 |
| | | | | 188/266.4 |
| 6,018,996 A * | 2/2000 | Matsuhiro | .......... | G01C 19/5649 |
| | | | | 73/504.12 |
| 6,098,663 A * | 8/2000 | Larsen | .................. | F16L 51/028 |
| | | | | 138/121 |
| 6,539,803 B2 * | 4/2003 | Mochida | ............ | G01C 19/5719 |
| | | | | 73/504.12 |
| 6,966,224 B2 * | 11/2005 | Yan | ...................... | G01C 19/5719 |
| | | | | 73/504.04 |

* cited by examiner

VIBRATION CONTROL DEVICE

RELATED APPLICATIONS

The present application is a National Phase of International Application Number PCT/JP2013/004789, filed Aug. 8, 2013, which claims priority to Japanese Application Number 2013-033877, filed Feb. 22, 2013.

TECHNICAL FIELD

The present invention relates to a vibration control device that can reduce both a vibration due to winds and a vibration due to earthquakes by being installed on a top floor of a tall building, for example.

BACKGROUND ART

Conventionally, in order to address a wind-induced vibration of a tower-like structure such as a tall building, a vibration control device is installed on a top floor of the tall building. Such control device detects a vibration of the building (building velocity and displacement) and response quantities of a movable mass, such as a velocity and a displacement of the movable mass, by a velocity sensor installed on a floor surface of the top floor of the building, and calculates a control force (driving force) by multiplying the detected response quantities by a constant control gain preliminarily calculated in accordance with an optimum control theory or the like. The device then drives the movable mass with the control force and transmits the vibration of the movable mass to the structure to damp the vibration of the structure.

Patent Literature 1 proposes a method that improves a conventional vibration control device by performing variable gain control and limit control on the control force for the movable mass so that the movable mass is maintained within an allowable stroke range even when a large input occurs due to an earthquake, for example.

Also, Patent Literature 2 proposes a method of adjusting the control gain so that the displacement of the movable mass is maintained within an allowable stroke range by predicting the displacement of the movable mass.

Furthermore, Patent Literature 3 proposes a device including a vibration control mode for responding to winds and a vibration control mode for responding to earthquakes, and is capable of addressing a wind-induced vibration and an earthquake-induced vibration by switching between the control modes. In Patent Literature 3, the vibration control mode for responding to earthquakes is configured by multiplying a control force obtained in the vibration control mode for responding to winds by a gain.

CITATION LIST

Patent Literature

Patent Literature 1: Japanese Patent No. 4857829
Patent Literature 2: Japanese Patent Laid-Open No. 2010-255791
Patent Literature 3: Japanese Patent Laid-Open No. 2011-174509

SUMMARY OF INVENTION

Technical Problem

According to Patent Literature 1, however, because a control command for displacement is multiplied by an appropriately selected gain of not more than one, a stroke of the movable mass becomes considerably small in comparison with the allowable stroke range when the movable mass is actually driven. Therefore, according to Patent Literature 1, it is not possible to fully utilize the allowable stroke range within which the movable mass can move, causing it impossible to achieve the best vibration control effect. Also, because the limit control is performed, a value of the command for displacement is saturated under a large input so that enough vibration control effect cannot be achieved.

Also, according to Patent Literature 2, the displacement of the movable mass may exceed the allowable stroke range due to an error of the prediction or a sudden input.

Also, according to Patent Literature 3, because the allowable stroke range is exceeded under an excessive disturbance, a device is stopped in a brake mode. Thus, vibration control is not actively carried out under an earthquake.

It is thus an object of the present invention, which has been accomplished in view of these technical problems, to provide a vibration control device that can achieve the best vibration control effect within an allowable stroke range of a movable mass.

Solution to Problem

The present invention, which has been accomplished for the above-described object, relates to a vibration control device for damping a vibration of a structure to be vibration-controlled by driving a movable mass disposed on the structure via an actuator on the basis of the vibration of the structure. The vibration control device includes: first detection means for detecting at least one of a displacement of the structure, a velocity of the structure, and an acceleration of the structure; second detection means for detecting at least one of a displacement of the movable mass and a velocity of the movable mass; and a controller that calculates at least one of a displacement deviation between a target displacement of the movable mass and the displacement of the movable mass detected by the second detection means and a velocity deviation between a target velocity of the movable mass and the velocity of the movable mass detected by the second detection means, and generates a control command for making the actuator drive the movable mass on the basis of at least one of the displacement deviation and the velocity deviation, wherein the target displacement and the target velocity are set in a manner that an amplitude of the movable mass is constant and that phases thereof are adapted such that the target displacement and the target velocity work to damp the vibration of the structure.

In the present embodiment, there are at least first to fourth methods for setting the target displacement and the target velocity, as described below. Any of these methods includes arithmetic operation, and it is desirable to choose a method in a manner that the operation exerts a smaller influence.

In the first method, the target displacement and the target velocity are set on the basis of a result obtained by multiplying a damping term $\alpha$, obtained by dividing a mass acceleration amplitude target value $A_{ref}$ for driving the movable mass at a constant amplitude within an allowable stroke range by an amplitude $A_b$ of a velocity waveform of the structure, by a building velocity $v_1$ of the structure detected by the first detection means.

In the second method, the target displacement and the target velocity are set on the basis of a result obtained by multiplying a damping term $\alpha$, obtained by dividing a mass velocity amplitude target value $A_{ref}$ for driving the movable mass at a constant amplitude within an allowable stroke range by an amplitude $A_b$ of a displacement waveform of the structure, by a building displacement $x_1$ of the structure detected by the first detection means.

In the third method, the target displacement and the target velocity are set on the basis of a result obtained by multiplying a damping term α, obtained by dividing a mass displacement target value $A_{ref}$ for driving the movable mass at a constant amplitude within an allowable stroke range by an amplitude $A_b$ of a velocity waveform of the structure, by a building velocity $v_1$ of the structure detected by the first detection means.

In the fourth method, the target displacement and the target velocity are set on the basis of a result obtained by multiplying a damping term α, obtained by dividing a mass velocity target value $A_{ref}$ for driving the movable mass at a constant amplitude within an allowable stroke range by an amplitude $A_b$ of a velocity waveform of the structure, by an acceleration $a_1$ of the structure detected by the first detection means.

Advantageous Effects of Invention

According to the vibration control device of the present invention, because the target displacement and the target velocity are set in a manner that an amplitude of the movable mass is constant and that phases thereof are adapted such that the target displacement and the target velocity work to damp the vibration of the structure, it is possible to achieve the best vibration control effect within an allowable stroke range of the movable mass.

DESCRIPTION OF EMBODIMENTS

First Embodiment

The present invention will now be described on the basis of embodiments with reference to the accompanying drawings.

Figure 1:
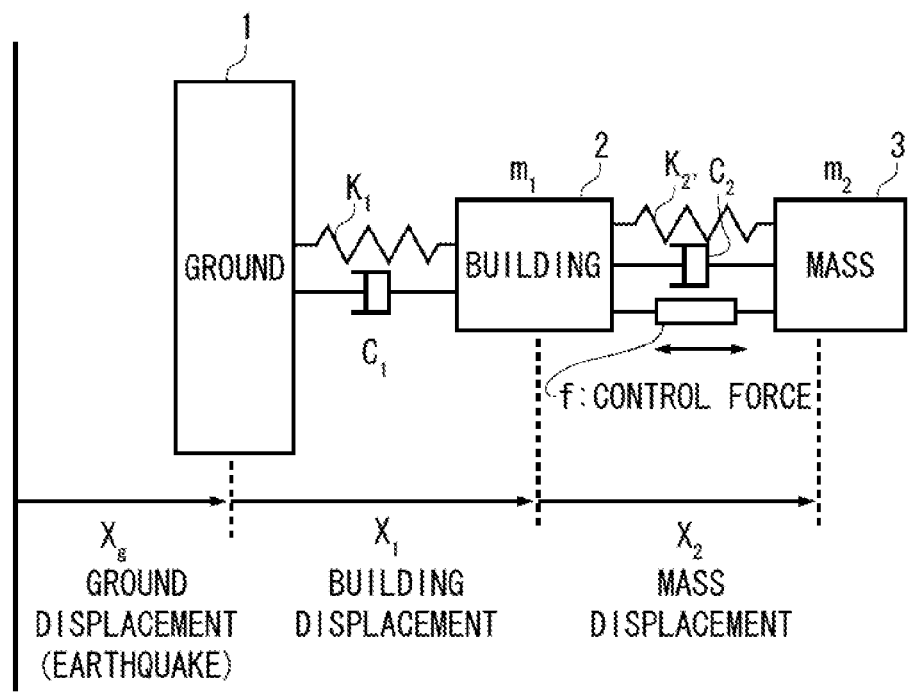
FIG. 1 is a diagram illustrating a modeled controlled object to which a control method of a vibration control device of the present embodiment is applied.

A vibration control device of the present embodiment is disposed on a modeled controlled object illustrated in FIG. 1, for example.

The controlled object includes a building 2 as a structure on a ground 1, and a movable mass (mass body) 3 constituting the vibration control device is disposed on the building 2. The controlled object is provided for damping a vibration of the building 2 by vibrating the movable mass 3 in a direction for counteracting the vibration of the building 2 and by transmitting the vibration of the movable mass 3 to the building 2.

In this model, a force acting between the ground 1 and the building 2 is approximated using a spring constant $K_1$ and a damping constant (damper coefficient) $C_1$. Here, the building 2 is considered as one rigid body, and it is supposed that the whole building 2 generates the force acting between the ground 1 and the building 2, causing a displacement. Also, the mass of the building 2 is represented as $m_1$.

Also, a force acting between the building 2 and the movable mass 3 is approximated using a spring constant $K_2$, a damping constant (damper constant) $C_2$, and a control force f. Here, the control force is a force for driving the movable mass 3. Also, the mass of the movable mass 3 is represented as $m_2$.

According to FIG. 1, a mathematical model of the controlled object can be represented with the following equations (1) and (2):

[Expression 1]

$$m_1(\ddot{x}_g+\ddot{x}_1)=-K_1x_1-C_1\dot{x}_1+K_2x_2+C_2\dot{x}_2-f \qquad (1)$$

$$m_2(\ddot{x}_g+\ddot{x}_1+\ddot{x}_2)=-K_2x_2-C_2\dot{x}_2+f \qquad (2)$$

Eliminating f (the control force for the movable mass 3) from equations (1) and (2) results equation (3):

[Expression 2]

$$(m_1+m_2)\ddot{x}_1+K_1x_1+C_1\dot{x}_1=-(m_1+m_2)\ddot{x}_g-m_2\ddot{x}_2 \qquad (3)$$

If equation (4) holds in equation (3), then equation (5) can be obtained:

[Expression 3]

$$m_2\ddot{x}_2=C'\dot{x}_1 \qquad (4)$$

[Expression 4]

$$(m_1+m_2)\ddot{x}_1+K_1x_1+(C_1+C')\dot{x}_1=-(m_1+m_2)\ddot{x}_g \qquad (5)$$

In equation (5), a viscosity coefficient of the building 2 is $C_1+C'$, which means that the damping capacity acting for vibration control becomes larger.

Now, rewrite equation (4) as equation (6):

[Expression 5]

$$\ddot{x}_2 = \frac{C'}{m_2}\dot{x}_1 = \alpha\dot{x}_1 \qquad (6)$$

In equation (6), a damping term α is determined by normalizing a building velocity (first-order differentiation of $x_1$) and using equation (7) so that the movable mass is maintained within an allowable stroke range. Here, $A_{ref}$ is a mass acceleration amplitude target value for driving the movable mass with a constant amplitude within the allowable stroke range, and $A_b$ is an amplitude of a velocity waveform (hereinafter referred to as velocity amplitude) of the building 2. In the present application, differentiation and integration mean time differentiation and time integration, respectively.

[Expression 6]

$$\alpha = \frac{A_{ref}}{A_b} \qquad (7)$$

In equation (7), α is a value that changes in accordance with the velocity amplitude of the building 2 that is sequentially detected. This means that the control method according to the present embodiment includes a variable gain control. Also, it is apparent from equations (6) and (7) that the displacement of the movable mass 3 can be made a constant value regardless of the vibration (amplitude) of the building. This constant value is of course within the allowable stroke range of the movable mass 3. Here, the displacement of the movable mass 3 is considered as a distance from a reference point, such as a center of a stroke.

This means that, by specifying equation (6) as a target acceleration of the movable mass 3, a value obtained by performing first-order integration of equation (6) as a target velocity of the movable mass 3, and a value obtained by performing second-order integration of equation (6) as a target displacement of the movable mass 3, it is possible to make the damping term of the building 2 to $C_1+C'$. That is, according to the control method of the present embodiment, the damping performance can be enhanced. Also, the target velocity and the target displacement are meant to move the movable mass at a constant amplitude in a manner that phases of the target velocity and the target displacement are respectively delayed 90 degrees with respect to the velocity and the displacement of the vibration of the building 2.

Figure 2:
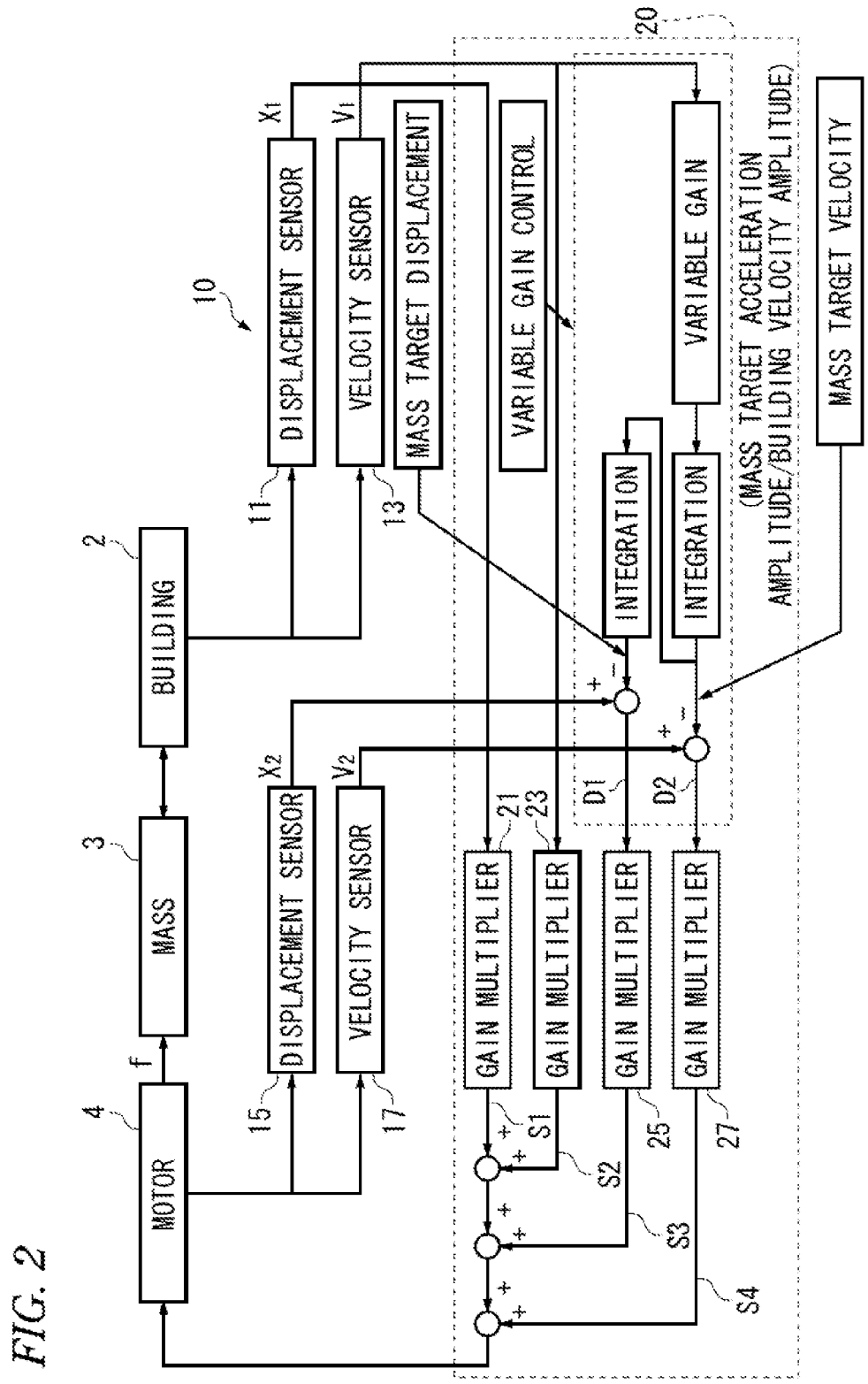
FIG. 2 is a diagram illustrating a control logic of the vibration control device of the present embodiment.

Next, a vibration control device 10 of the present embodiment will be described with reference to FIG. 2. In the following description, it is assumed that the vibration control device 10 is applied to the modeled controlled object including the building 2 and the movable mass 3 illustrated in FIG. 1.

The vibration control device 10 includes a building displacement sensor 11 and a building velocity sensor 13 attached on the building 2. The building displacement sensor 11 detects the amount of a horizontal displacement of the building 2 (building displacement $x_1$), and the building velocity sensor 13 detects a horizontal velocity of the building 2 (building velocity $v_1$ (first-order differentiation of $x_1$)).

The vibration control device 10 also includes a mass displacement sensor 15 and a mass velocity sensor 17 attached to a motor (actuator) 4 that drives the movable mass 3 disposed on a top portion of the building 2. The mass displacement sensor 15 detects the amount of a horizontal displacement of the movable mass 3 (mass displacement $x_2$) from the behavior of the motor 4, and the mass velocity sensor 17 detects a horizontal velocity of the movable mass 3 (mass velocity $v_2$ (first-order differentiation of $x_2$)) from the behavior of the motor 4.

Because velocity can be obtained by performing time differentiation of displacement, the building velocity $v_1$ and the mass velocity $v_2$ can be calculated on the basis of a detection result of the displacement sensor instead of relying on the velocity sensor. Likewise, the building displacement $x_1$ and the mass displacement $x_2$ can be calculated on the basis of a detection result of the velocity sensor instead of relying on the displacement sensor. Thus, although an example of disposing a displacement sensor and a velocity sensor is described herein, the present embodiment can be achieved with either a displacement sensor or a velocity sensor.

The vibration control device 10 includes a controller 20. The controller 20 includes a first gain multiplier 21 that outputs a signal S1 obtained by multiplying the building displacement $x_1$ by a control gain Kd1, a second gain multiplier 23 that outputs a signal S2 obtained by multiplying the building velocity $v_1$ by a control gain Kd2, a third gain multiplier 25 that outputs a signal S3 obtained by multiplying a deviation D10 between the mass displacement $x_2$ and a target displacement of the movable mass 3 by a control gain Kd3, and a fourth gain multiplier 27 that outputs a signal S4 obtained by multiplying a deviation D20 between the mass velocity $v_2$ and a target velocity of the movable mass 3 by a control gain Kd4. As described above, the target velocity of the movable mass 3 is a value obtained by performing first-order integration of equation (6), and the target displacement of the movable mass 3 is a value obtained by performing second-order integration of equation (6). In the controller 20, the step corresponding to the above-described equation (7) is executed in the portion labeled as "variable gain".

The control gains Kd1 to Kd4 are calculated in accordance with an optimum control theory, for example, and are meant to be constants that are arbitrarily set.

The controller 20 sums the signal S1 from the first gain multiplier 21, the signal S2 from the second gain multiplier 23, the signal S3 from the third gain multiplier 25, and the signal S4 from the fourth gain multiplier 27. The controller 20 gives the sum to the motor 4 as a control command for the control force f applied to the movable mass 3.

Here, another control logic (comparison logic) could be established in which a signal S3' obtained by multiplying the mass displacement $x_2$ by the control gain Kd3 and a signal S4' obtained by multiplying the mass velocity $v_2$ by the control gain Kd4 are summed to the above-described signals S1 and S2. This control logic is based on the assumption that the targets of the displacement and the velocity of the movable mass are made to zero. The control logic of the present embodiment, on the other hand, further includes the variable gain control, as described above. Thus, instead of making the targets of the displacement and the velocity of the movable mass 3 to zero, the movement that enhances the damping of the vibration of the building 2, which is a vibration-controlled structure, is adopted as target values.

As described above, according to the vibration control device 10, the target displacement and the target velocity are calculated using the variable control gain α such that the amplitude of the movable mass 3 becomes constant not only when the building 2 vibrates due to winds but also when the building 2 vibrates rapidly due to earthquakes. Thus, the best vibration control effect can be efficiently and reliably achieved within the allowable stroke range of the movable mass 3. Also, according to the present embodiment, the vibration control effect for earthquakes can be effectively obtained by simply changing control software without building a new device.

Figure 3:
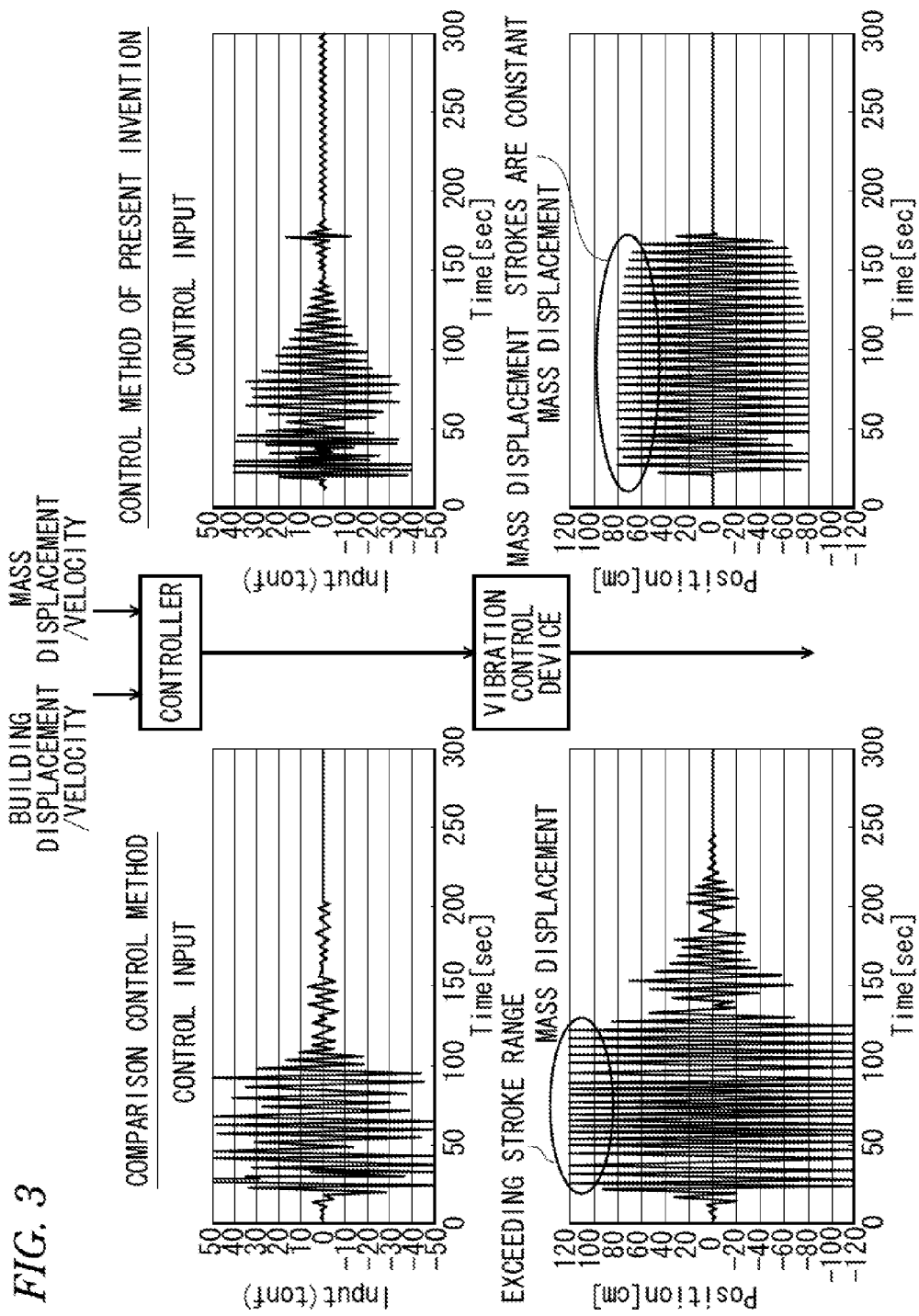
FIG. 3 is a diagram illustrating simulated vibration control effects of the vibration control device of the present embodiment and a comparison vibration control device.

Simulations have been conducted for checking the vibration control effect for the building 2 under an earthquake by using the comparison logic and the logic of the present embodiment. FIG. 3 shows the results of the simulations. According to the present embodiment, while the comparison active logic permits the movable mass 3 to vibrate beyond the allowable stroke range, in the present invention the vibration of the movable mass 3 includes a constant portion and is maintained within the allowable stroke range.

Second to Fourth Embodiments

Figure 4:
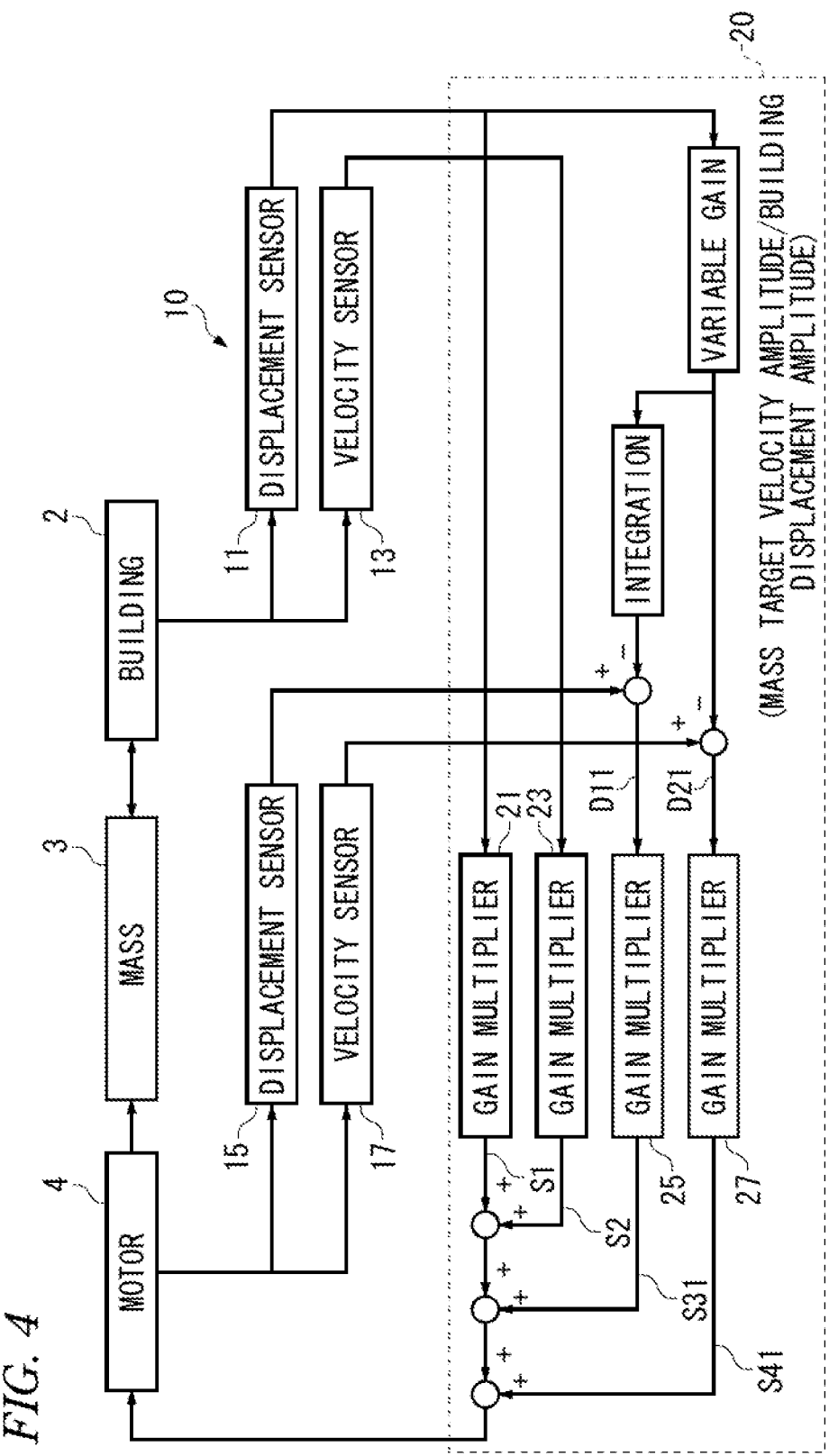
FIG. 4 is a diagram illustrating a variation of the control logic of the present embodiment.
Figure 5:
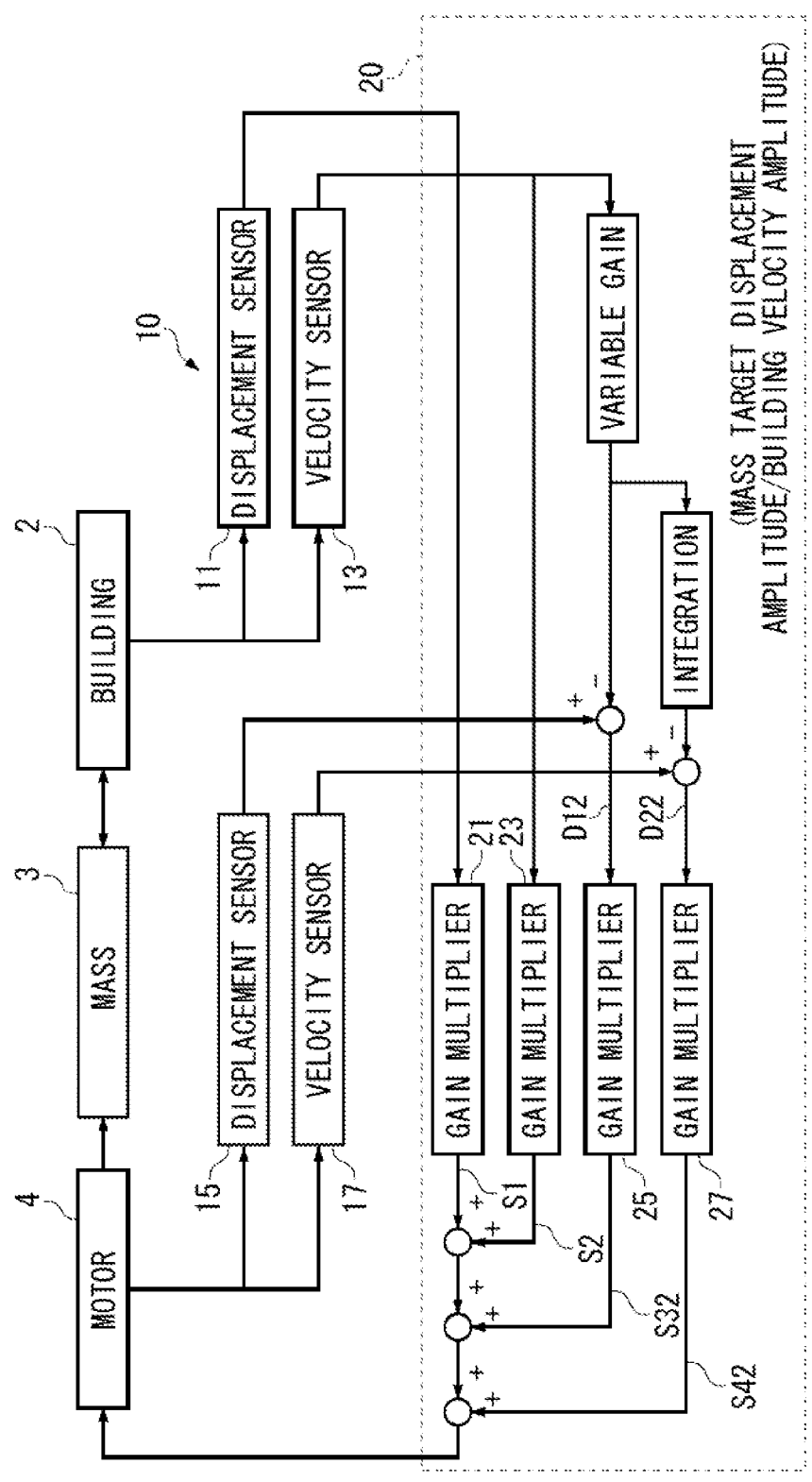
FIG. 5 is a diagram illustrating another variation of the control logic of the present embodiment.
Figure 6:
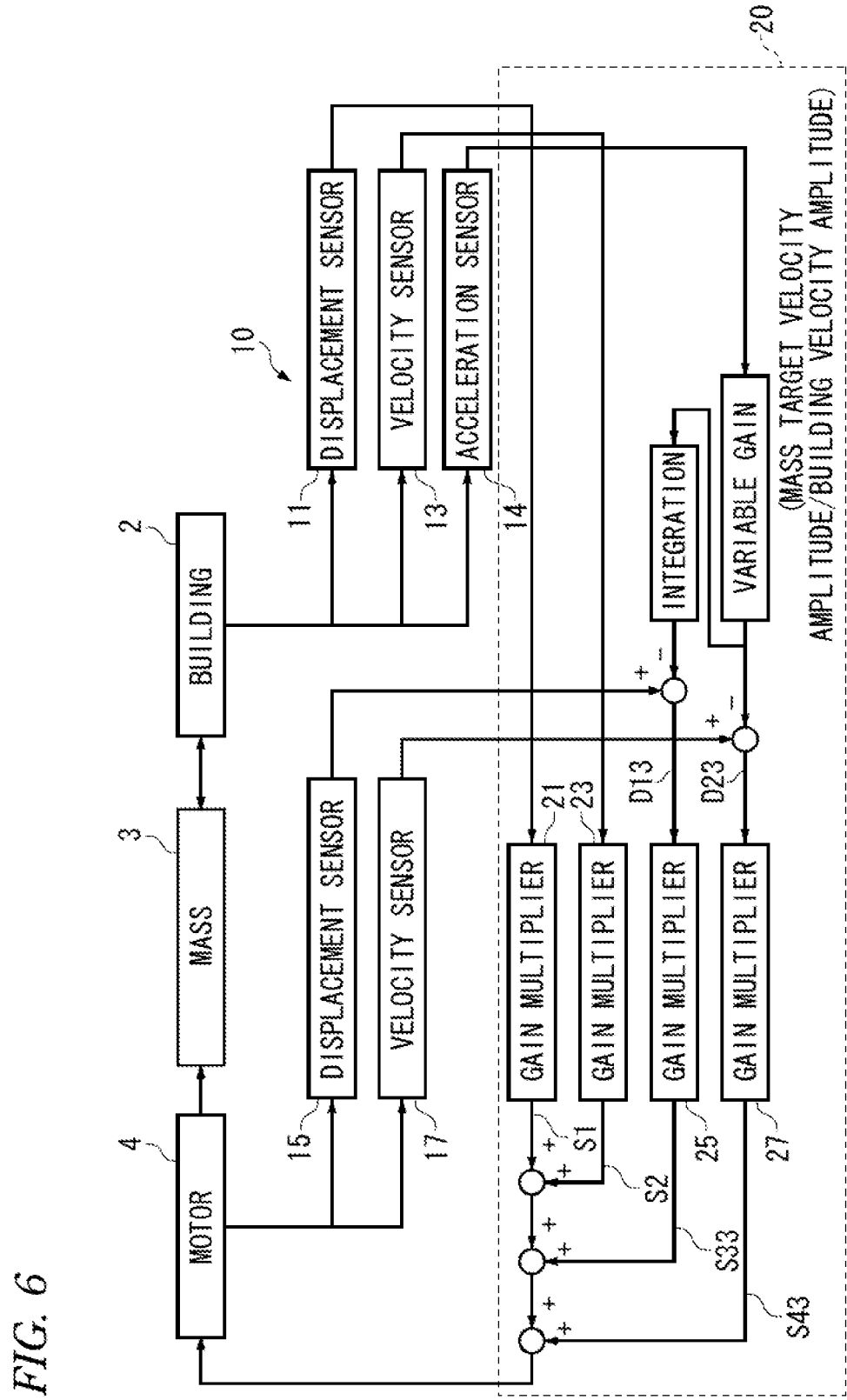
FIG. 6 is a diagram illustrating yet another variation of the control logic of the present embodiment.

In the first embodiment, the variable control gain α is calculated by dividing the target acceleration of the movable mass 3 by the velocity amplitude of the building 2, as shown in equation (7). The variable control gain α is, however, not limited to the above calculation, as long as the phase relationship indicated in equation (4), or the condition that the mass displacement $x_2$ is phase-delayed 90 degrees with respect to the building displacement $x_1$, is satisfied. For example, the following (b), (c), and (d) are combinations that satisfy the phase relationship of equation (4). The (b), (c), and (d) correspond to equations (6) and (7). The (a) corresponds to the above-described first embodiment. FIGS. 4, 5 and 6 illustrate control logics based on the following (b), (c), and (d). In these figures, the same components as those of FIG. 2 are indicated with the same numerals. In the following description of FIGS. 4, 5, and 6, the differences from the first embodiment will be mainly described.

[Expression 7]

$\ddot{x}_2 = \alpha \dot{x}_1$, α=mass target acceleration amplitude/building velocity amplitude (first embodiment)  (a)

$\dot{x}_2 = \alpha x_1$, α=mass target velocity amplitude/building displacement amplitude (second embodiment)  (b)

$x_2 = -\alpha \dot{x}_1$, α=mass target displacement amplitude/building velocity amplitude (third embodiment)  (c)

$\dot{x}_2 = -\alpha \ddot{x}_1$, α=mass target velocity amplitude/building acceleration amplitude (fourth embodiment)  (d)

Second Embodiment

In a second embodiment, α is calculated by dividing the target velocity amplitude of the movable mass 3 by the amplitude of the displacement waveform (hereinafter referred to as displacement amplitude) of the building 2. Thus, α changes in accordance with the displacement amplitude of the building 2 that is sequentially detected. As with the first embodiment, the mass displacement can be maintained within a constant range regardless of the vibration of the building 2. This is also true of embodiments 3 and 4.

As illustrated in FIG. 4, in the second embodiment, a value obtained by performing first-order integration of the variable gain obtained with the above (b) (first-order differentiation of the displacement $x_2$ of the movable mass 3) is used as a target displacement of the movable mass 3.

In the second embodiment, the third gain multiplier 25 outputs a signal S31 obtained by multiplying a deviation D11 between the mass displacement $x_2$ and the target displacement of the movable mass 3 by a control gain Kd31, and the fourth gain multiplier 27 outputs a signal S41 obtained by multiplying a deviation D21 between the mass velocity $v_2$ and the target velocity of the movable mass 3 by a control gain Kd41. The first gain multiplier 21 and the second gain multiplier 23 are the same as those of the first embodiment.

In the second embodiment, the signal S1 from the first gain multiplier 21, the signal S2 from the second gain multiplier 23, the signal S31 from the third gain multiplier 25, and the signal S41 from the fourth gain multiplier 27 are summed. The sum is given to the motor 4 as a control command for the control force f applied to the movable mass 3.

Third Embodiment

In the third embodiment, α is calculated by dividing the target displacement amplitude of the movable mass 3 by the velocity amplitude of the building 2. Thus, α changes in accordance with the velocity amplitude of the building 2 that is sequentially detected.

As illustrated in FIG. 5, in the third embodiment, a value obtained by performing first-order integration of the variable gain obtained with the above (c) (the mass displacement $x_2$ of the movable mass 3) is used as a target velocity of the movable mass 3.

The (c) indicates that, if the relationship (equation (4)) in which the mass displacement $x_2$ is phase-delayed 90 degrees with respect to the building displacement $x_1$ is represented with the building velocity and the mass displacement, then the sign inversion of the building velocity has a phase which proceeds 90 degrees with respect to the mass displacement.

In the third embodiment, the third gain multiplier 25 outputs a signal S32 obtained by multiplying a deviation D12 between the mass displacement $x_2$ and the target displacement of the movable mass 3 by a control gain Kd32, and the fourth gain multiplier 27 outputs a signal S42 obtained by multiplying a deviation D22 between the mass velocity $v_2$ and the target velocity of the movable mass 3 by a control gain Kd42. The first gain multiplier 21 and the second gain multiplier 23 are the same as those of the first embodiment.

In the third embodiment, the signal S1 from the first gain multiplier 21, the signal S2 from the second gain multiplier 23, the signal S32 from the third gain multiplier 25, and the signal S42 from the fourth gain multiplier 27 are summed. The sum is given to the motor 4 as a control command S for the control force f applied to the movable mass 3.

Fourth Embodiment

The fourth embodiment includes a building acceleration sensor 14 for detecting a horizontal acceleration of the building 2.

Also, in the fourth embodiment, α is calculated by dividing a target velocity amplitude value of the movable mass 3 by the amplitude of the acceleration waveform (hereinafter referred to as acceleration amplitude) of the building 2. Thus, α changes in accordance with the acceleration amplitude of the building 2 that is sequentially detected.

As illustrated in FIG. 6, in the fourth embodiment, a value obtained by performing first-order integration of the variable gain obtained with the above (d) (first-order differentiation of the displacement $x_2$ of the movable mass 3) is used as a target displacement of the movable mass 3.

In the fourth embodiment, the third gain multiplier 25 outputs a signal S33 obtained by multiplying a deviation D13 between the mass displacement $x_2$ and the target displacement of the movable mass 3 by a control gain Kd33, and the fourth gain multiplier 27 outputs a signal S43 obtained by multiplying a deviation D23 between the mass velocity $v_2$ and the target velocity of the movable mass 3 by a control gain Kd43. The first gain multiplier 21 and the second gain multiplier 23 are the same as those of the first embodiment.

The signal S1 from the first gain multiplier 21, the signal S2 from the second gain multiplier 23, the signal S33 from the third gain multiplier 25, and the signal S43 from the fourth gain multiplier 27 are summed. The sum is given to the motor 4 as the control command S for the control force f applied to the movable mass 3.

As described in the above description of the second to fourth embodiments, it is only necessary to specify a target value for either the displacement or the velocity of the movable mass 3. This means that the control method of the present invention can be utilized regardless of the type of sensors used, and it is possible to cut the cost of adding or re-installing sensors.

In order to obtain a vibration control effect more reliably, however, it is preferable to specify a target value for both the displacement and the velocity, as with the first embodiment.

In the first to fourth embodiments, if arithmetic operation such as differentiation and integration is used in an installed sensor, it is desirable to choose a combination in which the operation exerts a smaller influence.

Although the present invention has been described in accordance with the embodiments, it is possible to choose any of the configurations described in the above embodiments or arbitrarily change to another configuration, as long as they do not depart from the gist of the present invention.

For example, in the above embodiments, although an example is described in which the phase delay is 90 degrees, which is most preferable, the present invention is not limited to this. Because the phase delay larger than 0 degrees and less than 180 degrees contributes to damping, it is possible in the present invention to choose any angle of phase delay within this range. However, the further the phase delay gets away from the most preferable 90 degrees, the more the damping performance decreases. Therefore, the phase delay is preferably plus or minus 20 degrees, more preferably plus or minus 10 degrees, and still more preferably plus and minus 5 degrees from 90 degrees.

REFERENCE SIGNS LIST 1 ground
2 building
3 movable mass
4 motor
10 vibration control device
20 controller
11 building displacement sensor
13 building velocity sensor
14 building acceleration sensor
15 mass displacement sensor
17 mass velocity sensor
21 first gain multiplier
23 second gain multiplier
25 third gain multiplier
27 fourth gain multiplier

The invention claimed is:

1. A vibration control device for damping a vibration of a structure to be vibration-controlled by driving a movable mass disposed on the structure via an actuator on the basis of the vibration of the structure, comprising:
   first detection means for detecting at least one of a displacement of the structure, a velocity of the structure, and an acceleration of the structure;
   second detection means for detecting at least one of a displacement of the movable mass and a velocity of the movable mass; and
   a controller that calculates at least one of a displacement deviation between a target displacement of the movable mass and the displacement of the movable mass detected by the second detection means and a velocity deviation between a target velocity of the movable mass and the velocity of the movable mass detected by the second detection means, and generates a control command for making the actuator drive the movable mass on the basis of at least one of the displacement deviation and the velocity deviation, wherein
   the target displacement and the target velocity are set in a manner that an amplitude of the movable mass is constant and that phases thereof are adapted such that the target displacement and the target velocity work to damp the vibration of the structure.

2. The vibration control device according to claim 1, wherein
   the target displacement and the target velocity are set on the basis of a result obtained by multiplying a damping term α, obtained by dividing a mass acceleration amplitude target value $A_{ref}$ for driving the movable mass at a constant amplitude within an allowable stroke range by an amplitude $A_b$ of a velocity waveform of the structure, by a building velocity $v_1$ of the structure detected by the first detection means.

3. The vibration control device according to claim 2, wherein
   the controller sets the target displacement and the target velocity such that phases of the target displacement and the target velocity are delayed 90 degrees with respect to the vibration of the structure.

4. The vibration control device according to claim 1, wherein
   the target displacement and the target velocity are set on the basis of a result obtained by multiplying a damping term α, obtained by dividing a mass velocity amplitude target value $A_{ref}$ for driving the movable mass at a constant amplitude within an allowable stroke range by an amplitude $A_b$ of a displacement waveform of the structure, by a building displacement $x_1$ of the structure detected by the first detection means.

5. The vibration control device according to claim 4, wherein
   the controller sets the target displacement and the target velocity such that phases of the target displacement and the target velocity are delayed 90 degrees with respect to the vibration of the structure.

6. The vibration control device according to claim 1, wherein
   the target displacement and the target velocity are set on the basis of a result obtained by multiplying a damping term α, obtained by dividing a mass displacement target value $A_{ref}$ for driving the movable mass at a constant amplitude within an allowable stroke range by an amplitude $A_b$ of a velocity waveform of the structure, by a building velocity $v_1$ of the structure detected by the first detection means.

7. The vibration control device according to claim 6, wherein
   the controller sets the target displacement and the target velocity such that phases of the target displacement and the target velocity are delayed 90 degrees with respect to the vibration of the structure.

8. The vibration control device according to claim 1, wherein
   the target displacement and the target velocity are set on the basis of a result obtained by multiplying a damping term α, obtained by dividing a mass velocity target value $A_{ref}$ for driving the movable mass at a constant amplitude within an allowable stroke range by an amplitude $A_b$ of an acceleration waveform of the structure, by an acceleration $a_1$ of the structure detected by the first detection means.

9. The vibration control device according to claim 8, wherein
   the controller sets the target displacement and the target velocity such that phases of the target displacement and the target velocity are delayed 90 degrees with respect to the vibration of the structure.

10. The vibration control device according to claim 1, wherein
the controller sets the target displacement and the target velocity such that phases of the target displacement and the target velocity are delayed 90 degrees with respect to the vibration of the structure.

* * * * *